United States Patent
Ho et al.

(10) Patent No.: US 10,703,411 B2
(45) Date of Patent: Jul. 7, 2020

(54) CONFIGURABLE PARKING ASSISTANCE DEVICE AND METHOD

(71) Applicants: Allen J Ho, Northville, MI (US); Lana J Ho, Northville, MI (US)

(72) Inventors: Allen J Ho, Northville, MI (US); Lana J Ho, Northville, MI (US)

(*) Notice: Subject to any disclaimer, the term of this patent is extended or adjusted under 35 U.S.C. 154(b) by 0 days.

(21) Appl. No.: 15/871,988

(22) Filed: Jan. 16, 2018

(65) Prior Publication Data
US 2019/0217890 A1    Jul. 18, 2019

(51) Int. Cl.
| | | |
|---|---|---|
| B62D 15/02 | (2006.01) | |
| G08G 1/16 | (2006.01) | |
| B60Q 1/00 | (2006.01) | |
| B60W 50/14 | (2020.01) | |

(52) U.S. Cl.
CPC ............ B62D 15/028 (2013.01); B60Q 1/00 (2013.01); G08G 1/168 (2013.01); B60T 2201/10 (2013.01); B60W 2050/146 (2013.01)

(58) Field of Classification Search
CPC ............................. B62D 15/028; G08G 1/168
USPC ....................................................... 340/932.2
See application file for complete search history.

(56) References Cited

U.S. PATENT DOCUMENTS

| | | | |
|---|---|---|---|
| 4,665,378 A | 5/1987 | Heckethorn | |
| 5,147,680 A * | 9/1992 | Slysh | B05D 1/325 216/41 |
| 5,774,212 A * | 6/1998 | Corby, Jr. | G01N 21/95684 356/237.2 |
| 6,002,346 A | 12/1999 | Bowden | |
| 6,154,150 A | 11/2000 | Laubach | |
| 6,191,706 B1 | 2/2001 | Kositkun | |
| 6,218,962 B1 | 4/2001 | Fiene | |
| 6,853,313 B2 * | 2/2005 | Newcomer | G08G 1/161 180/199 |
| 2001/0029675 A1 * | 10/2001 | Webb | G01C 15/00 33/286 |
| 2005/0134482 A1 * | 6/2005 | Li | B60Q 1/48 340/932.2 |
| 2006/0179671 A1 * | 8/2006 | Ghatak | E04H 6/426 33/264 |
| 2009/0237766 A1 * | 9/2009 | Liu | G02B 6/0023 359/223.1 |
| 2010/0106056 A1 * | 4/2010 | Norris | A61B 8/0841 600/567 |
| 2012/0180366 A1 * | 7/2012 | Jaroh | F41G 3/06 42/114 |

(Continued)

*Primary Examiner* — Omar Casillashernandez (57) ABSTRACT

An apparatus and method for assisting a vehicle into a desired position within a parking space. The device uses non-uniform light strength light line or other pattern projection to generate highlighted projections onto a target at a vehicle dashboard. The user may form a strong projection by focusing multi laser projections to overlap each other at the target. The driver knows the location of the vehicle by memorizing the patterns along the projections relative to the locations in the parking space. The driver maneuvers the vehicle direction and speed in order to make the projections onto the target, to avoid hitting the garage door frame, and to park on a desired position inside the parking space. The devices can be used for both guiding the vehicle into the parking space at a predetermined path to avoid nearby objects and stopping the vehicle at the desired place and direction.

18 Claims, 5 Drawing Sheets

(56) References Cited

U.S. PATENT DOCUMENTS

2014/0347675 A1* 11/2014 Romashkin ............. G01P 3/685
356/614

* cited by examiner

CONFIGURABLE PARKING ASSISTANCE DEVICE AND METHOD

BACKGROUND

The field of the invention is a parking guide apparatus and method for use in a parking space to assist a driver of a vehicle to properly park the vehicle in a desired place. More specifically, this invention involves a guidance system to assist the driver to properly navigate on a predetermined parking path and to stop the vehicle at a desired point within the parking space.

Many people are uncomfortable with just the thought of parking in a garage, especially those driving in a large vehicle. The driver may veer the vehicle off course and hit the garage door frame, being unable to stop the vehicle from hitting the wall, or stop too early and get the rear end of the vehicle crushed by a closing garage door.

Other devices include a light source pointing down from the ceiling of the garage onto the vehicle. The light source projects a beam or dot which, when adjusted properly, shines onto a specific portion of the dashboard of a vehicle when the vehicle is in the proper location within the garage. Such devices are shown in the U.S. Pat. No. 6,191,706B1 to Kositkun, U.S. Pat. No. 6,002,346 to Bowden et at., and the U.S. Pat. No. 6,154,150 to Laubach. The disadvantage of these particular methods is that they do not aid the driver in reaching the proper location. They merely inform the driver of when the proper location is reached. Additionally, when the driver has substantially pulled into the garage and noticed that the light dot is laterally off by some amount, he must make last-minute maneuvers in the garage in order to align the dot or repeat the parking process. Such actions either leave the vehicle parked crooked in the garage or waste time moving the vehicle backward and forwards. U.S. Pat. No. 6,853,313 B2 to Newcomer introduced a device with two laser lines. The first linear ray of light is projected along the centerline of a parking space. The second linear ray of light is projected at an angle 90° to the first line and intersecting the first linear ray at the vehicle parking position. The first linear ray of light guides the driver while moving into and through the designated space. As the driver nears the desired parking position, the second linear ray of light will move towards a target at the vehicle dashboard. When the target intersects with the second linear rays of light, the vehicle is in the desired parking position. With this approach, the driver still has to substantially pull into the garage when the second liner ray is projected into the vehicle, and he must perfectly stop the vehicle within seconds after the second ray has appeared onto the vehicle. The driver has to be very concentrated during the whole parking process due to the fact that the driver does not know precisely when the vehicle will pass some nearby projects, such as garage door frame. This approach also requires a high-power laser source to make the long laser lines due to the fact that the laser has to be visible to the driver. The laser beam has to have a large laser fan angle, which is the angle produced by accessory line or pattern generators. Due to the widespread of the laser beam, the driver's eyes are easily exposed to the laser beam.

OBJECT AND SUMMARY OF INVENTION

It is therefore, an object of this invention to overcome the disadvantages of the above noted devices and to provide a parking assistance device that is easy to use and has more information available for a vehicle driver to avoid the vehicle mirror hitting garage door frame or other objects at a parking space and stopping the vehicle on a desired location parking. The new device is a configurable and low-cost product. It is a further goal to provide such a parking aid device that does not hinder the use of the garage when no vehicle is present.

The device has one or more low power laser sources, most likely less than 5 mW laser line or pattern sources. The laser sources are installed on a base. The laser lens will form a non-uniform strength light line or pattern that has a distinct change in projection light strength and width along the line or pattern to make the driver have a clear reference on the vehicle location along the line or pattern. The projection pattern includes short laser line with the end of line as the marks, dash line, dot lines, etc. A plurality of lasers on one or multi bases can also be independently adjusted by a user to form various patterns, such as a X shape, V shape, dash line, etc. The laser lens has small fan angle of less than 15° which only projects a line or pattern with limited projection area onto the vehicle dashboard when the vehicle is under the projection to maintain the visibility of the projection with a low power laser source and reduce the chance that people inside the parking space directly view the laser beams.

One of the devices may have two laser lines. The user may put one device on a garage door rail or the garage wall/ceiling near the garage door. A target at a location on the vehicle dashboard is predetermined by the user. The target can be a dot on the dashboard, a sticker placed on the vehicle, or any other item used as a reference to the laser projections on the vehicle dashboard. A user configures the laser to form laser line projection(s) at the target. When the vehicle is under the projections, the drive maintains the laser projections on the target to avoid the vehicle mirror hitting the garage door frame and the driver knows the relative location of the vehicle mirror vs. the garage door frame through a unique pattern on the projected line so the driver can reduce vehicle speed and better following the laser pattern when the vehicle's outside mirror passes the garage door or other nearby objects. If the garage door area is too bright to view the laser projection, the user can make multiple laser lines to focus onto the same location of the targeted area of the vehicle, overlapping each other to multiply the laser line light strength with one or more laser line devices.

The driver may also put one or more devices with two laser lines on each device near a parking desired area. Adjust the laser lines to form a user preferred pattern, such as V shape, dash lines, etc., to guide the vehicle moving and stopping at a desired point. The device may also have a mechanism to prevent a laser line from overlapping onto another laser line projection too close to the laser source to form a short and strong laser light projection that the user eye may receive. When the driver of the vehicle aligns the lines onto a predetermined target on the vehicle, the driver will know the exact vehicle location along the non-uniform laser lines or short laser lines and easily stop at the targeted location in the garage. The non-uniform lines or short lines make it possible to park two different size vehicles at the same parking space without adjusting the laser projections by remembering to stop each vehicle at its targeted location on the laser projections.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
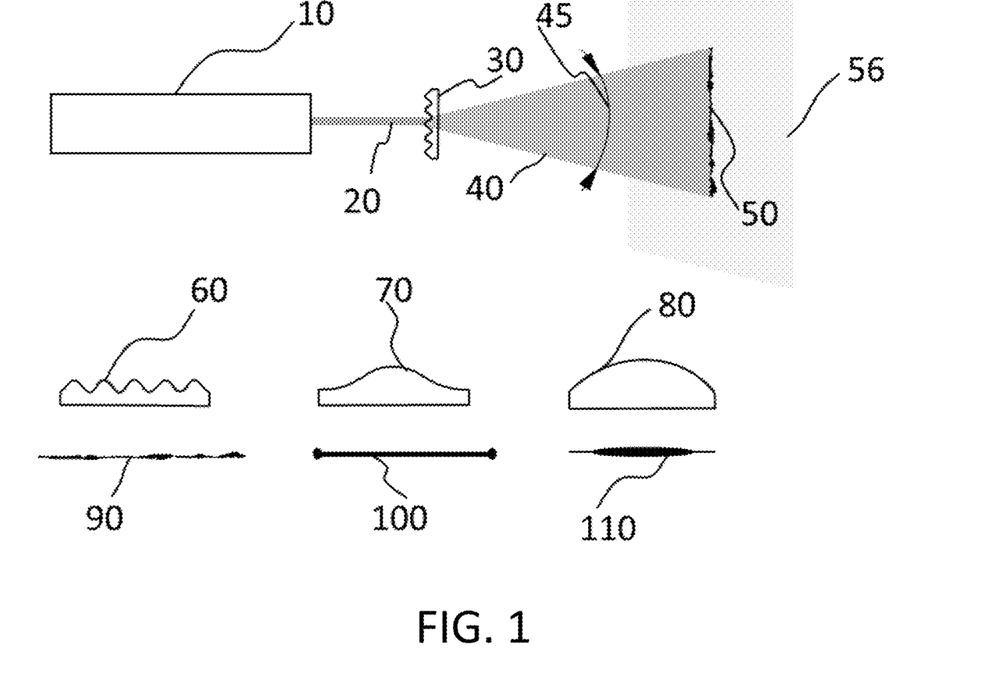
FIG. 1 is an illustration of a laser line generator.

Referring to FIG. 1, a typical laser line projection 50 onto a wall 56 is generated by putting a lens 30 in front of a laser beam 20 generated by a diode laser beam generator 10. The laser line has a fan angle 45. The lens profiles often used are cylindrical lens 80, aspheric lens 60, or Powell lenses 70. Many aspheric profile lenses are low-cost plastic lenses. The aspheric lens 60 is easily created with non-uniform light strength and width along the laser line 90, and with some laser dots at the ends of line 90. The highly precise Power lens 70 can generate a very uniform laser line, which can easily be modified to generate high strength points at both ends of the laser line 100. The cylindrical lens 80, by its characteristics, creates a non-uniform line with strong middle portion and weak ends, as shown in the laser line 110. Above type lenses or other type laser lenses can be used for this invention.

Figure 2:
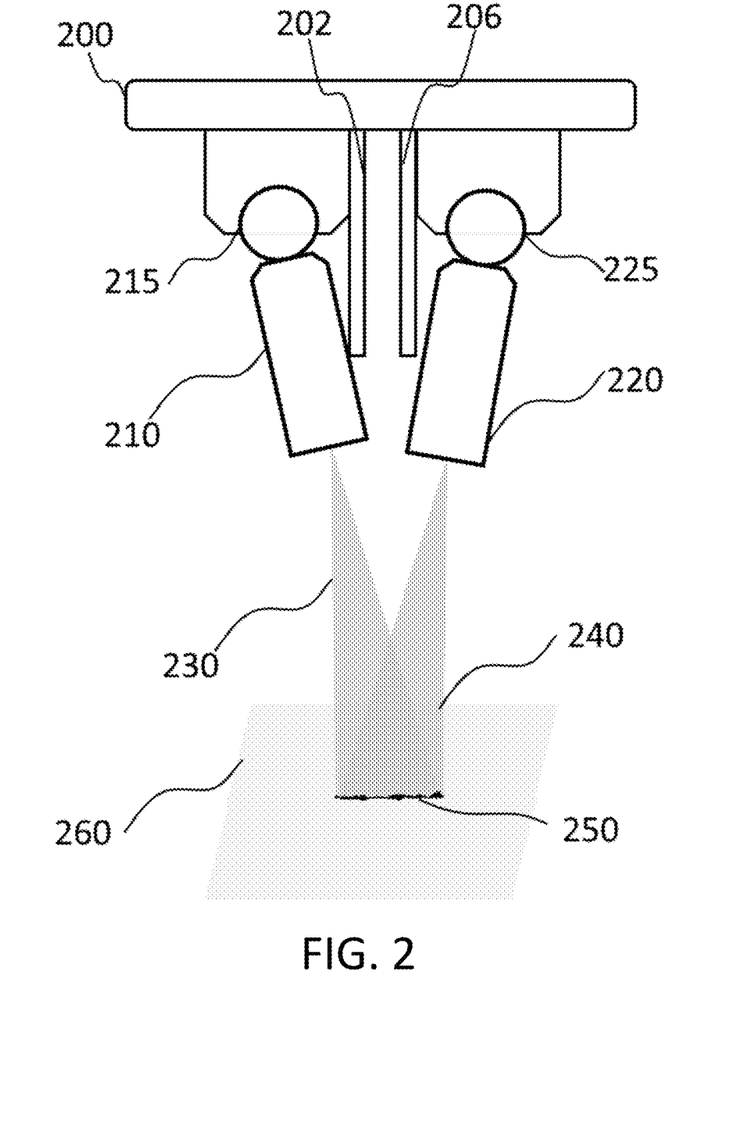
FIG. 2 is an illustration of a laser parking assistance device.

Referring to FIG. 2, a device has two laser line generators, 210 and 220. The laser line generators are linked to a base 200 with ball joints 215 and 225 to allow the user to rotate the laser generator around its base which has three rotational degree of freedom. Two laser lines are focused at a plate 260 and overlap each other to form a double strength laser light line. Two structures, 202 and 206, are built to prevent the two laser generators from focusing within a certain distance in order to prevent a short, strong strength of laser light that human eye may receive. Other mechanical or electrical methods (not shown) may be used in order to prevent a strong strength of laser light that human eye may receive. For example, electrical sensors and switch circuits (not shown) are installed inside said apparatus to constrain the laser projections from overlapping each other within a predetermined distance. When the laser beams overlap each other within a predetermined distance, the circuits will switch off said lasers and may turn on a warning light (not shown). Over a predetermined distance, the combined laser beam will be weaker due to the spread of laser beam. The device is powered by electrical power (not shown).

Figure 3:
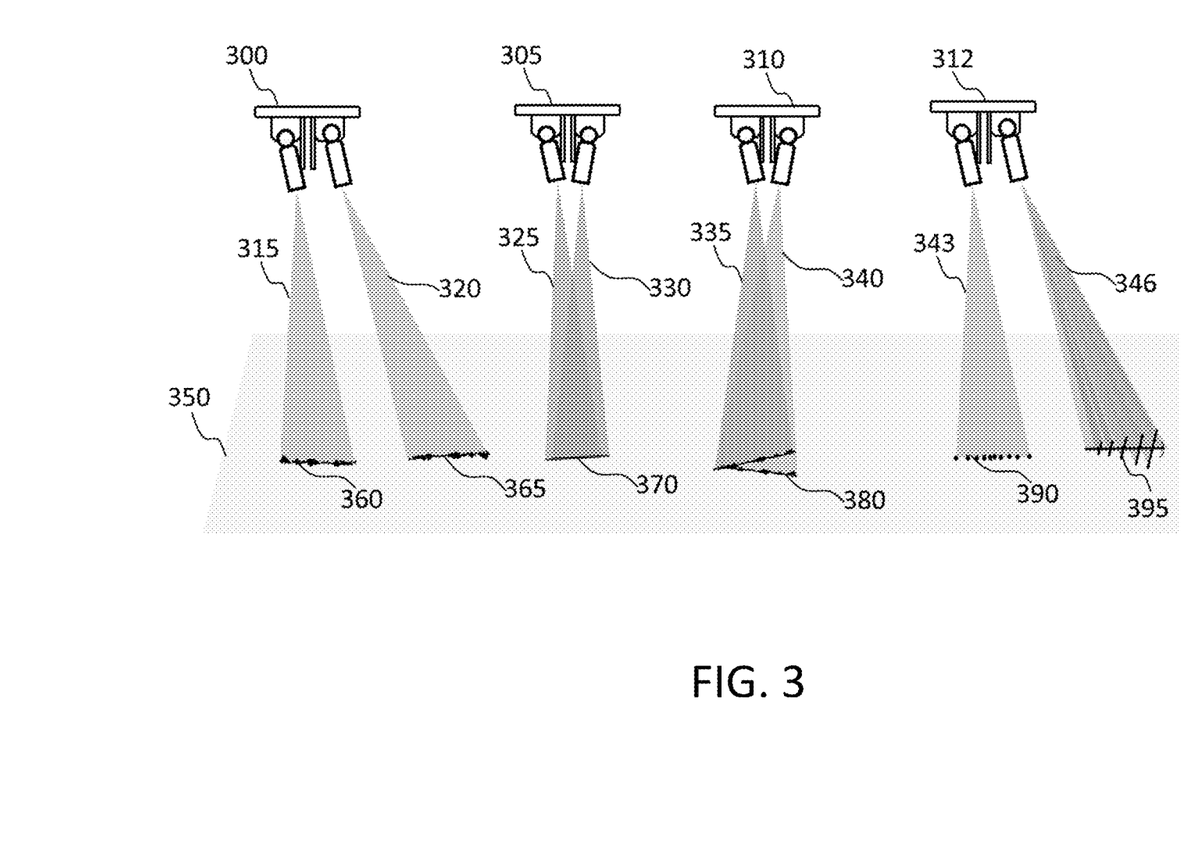
FIG. 3 is an illustration of several laser projection patterns that are generated by the laser parking aid device shown in FIG. 2.

FIG. 3 shows several patterns that can be generated by the device shown in FIG. 2. The device 300 generates two short laser beams 315 and 320 at a board 350 to form two lines projected in serial. The device 305 generates two laser beams 325 and 330. The beams 325 and 330 partially overlap each other to form a line 370 with double light strength on the overlapped part on the board 350. The line 370 also has unique light pattern along the line generated by the partially overlapped projections. The device 310 generates two laser beams 335 and 340 to form a "V" shape 380 on the board 350. The device 312 generates a dot line 390 with the laser beam 343. Another beam 346 of the device 312 generates a shape 395 with multi lines cross a straight line. The device can also be configured to form T shape, X shape, or other predetermined shape (not shown). Special lenses can also generate T shape, X shape, or other predetermined shape (not shown).

Figure 4:
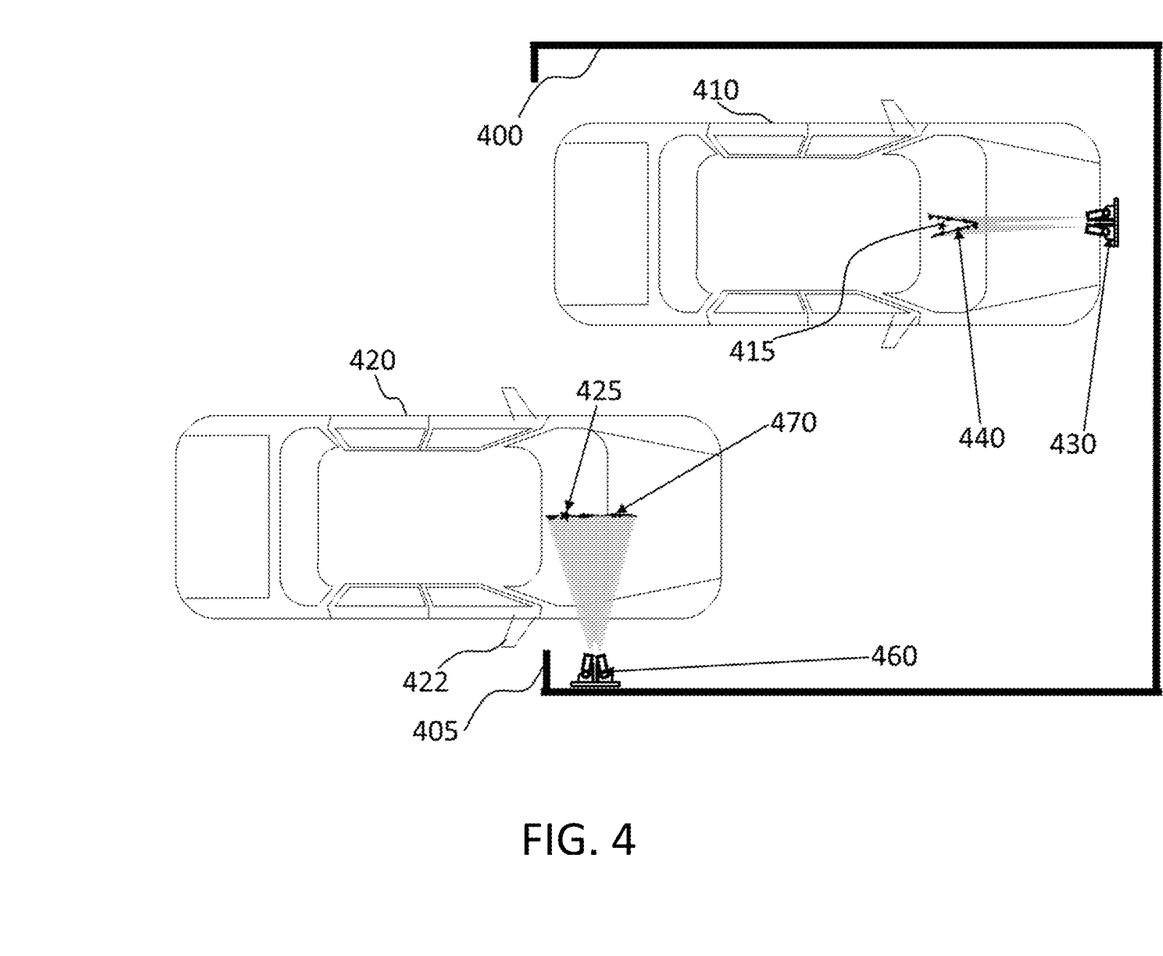
FIG. 4 is a top view of a garage with the laser parking aid device to illustrate the method that uses a V shape laser projection to aid a vehicle to stop at a targeted location and another parking aid device to safely guide a vehicle through a garage door frame.

FIG. 4 is a top view of a garage illustrating the method. A two-car garage 400 with two cars 410 and 420 uses two parking aid devices 430 and 460 which are the same type of device as shown in FIG. 2. The device 460 is installed on a side wall of the garage 400 near the garage door frame 405. The device 460 projects two beams, which overlap a single line projection 470 on the dashboard center line of the car 420 to double the line's light strength. When the car 420's mirror 422 approaches the garage door frame 405, the non-uniform single line projection starts to appear at the car 420 dashboard. A driver maneuvers the car to make the projected line 470 onto a target 425, which is a star shape at the middle of the vehicle dashboard. The driver knows when the vehicle 420 is near and passing the mirror through the door frame by the unique characteristics along the projected line 470 passing through the target 425. Hence the driver can reduce the car 420 speed when the car mirror 422 is near the door frame 405 to make sure the projected line 470 is on the target 425 to avoid the mirror 422 hitting the door frame 405.

The device 430 on FIG. 4 is installed at the ceiling of garage 400 near the car 410's parking desired location. The device 430 projected a "V" shape projection 440 on the vehicle 410's dashboard. The projection 440 has non-uniform light strength and width along the lines that form the V shape 440. A star mark 415 at the vehicle 410 dashboard is a target. The laser projection V shape 440 is pre-adjusted to make the bottom point of V shape 440 at the target star 415 when the targeted vehicle is in a desired parking position. When a driver moves the car 410 near the desired parking location, the V shape projection 415 first appears on the hood of the car 410 then continuously moves onto the car 410 dashboard. With the car 410 approaching the desired parking location, the V shape approaches the targeted point 415 on the dashboard. The driver has a lot of information due to the fact that the lines that form the V are non-uniform and when the dashboard of the car 410 shows the non-uniform lines, the driver knows the location of car 410 relative to garage walls through these unique marks on the lines and their location on the dashboard of car. The driver adjusts car direction, speed and finally stops the car when the bottom of the V shape 440 reached the targeted point 415. The car is then parked at the desired location.

Figure 5:
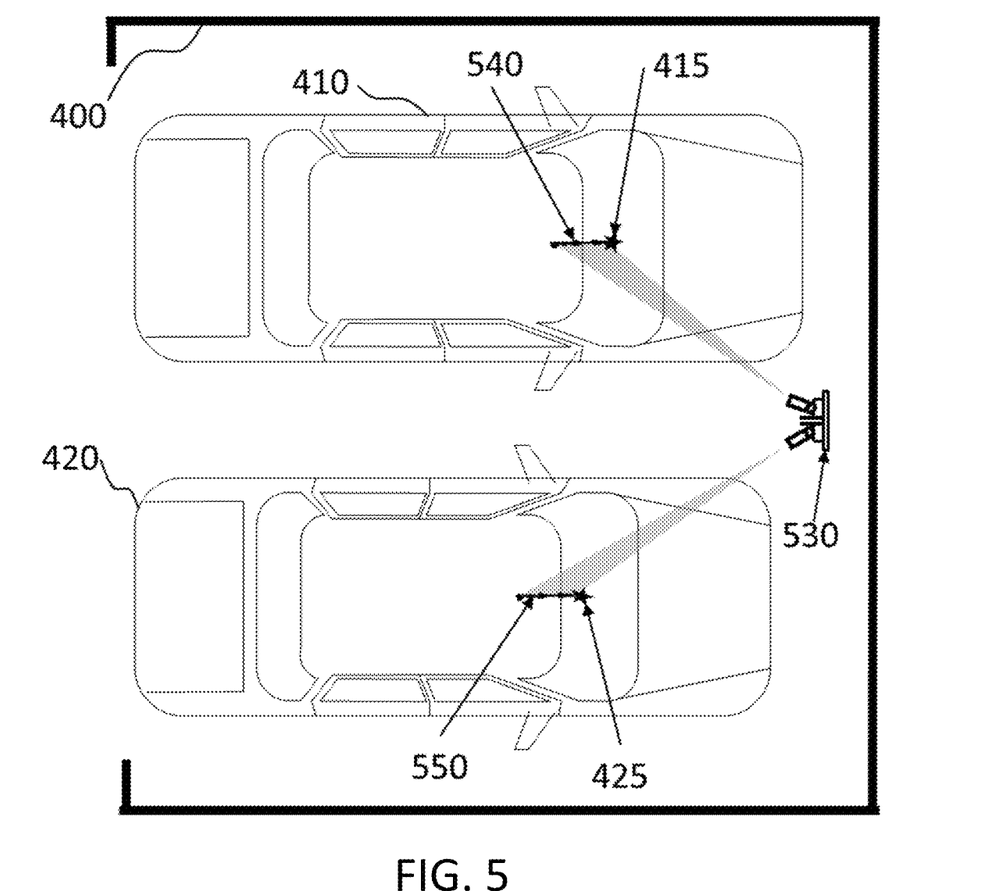
FIG. 5 is a top view of a garage with the laser parking aid device to illustrate the method of one device to aid two vehicles parking.

FIG. 5 is a top view of the garage 400 with a laser parking aid device 530 to illustrate a method of one device 530 to aid two vehicles 410 and 420 parking. The device 530's laser beams project two short-line projections 540 and 550 with the end of the line projected at the vehicle's dashboard targets 415 and 425 when the vehicles parked at desired parking locations. During the parking process, the vehicle 410 approaches the predetermined parking position. As soon as the laser line 540 projects onto the dash board, the driver of the vehicle from the relative location of the laser line vs. the target knows the distance of the vehicle vs. the desired parking position and direction. The laser projection 540 shows up on the vehicle 410 dashboard, and the driver moves the vehicle to make the moving laser projection line 540 follow the mark 415 until the line 540 end reaches the target 415 and stops the vehicle. The same applies to parking the vehicle 420.

We claim:

1. A parking aid apparatus for guiding a vehicle into a desired parking position through a predetermined parking pass location, comprising:
   a housing for mounting to a structure;
   one or a plurality of light sources mounted in said housing and producing light pattern projections with each said light source passing through a single lens to form a visible pattern or short light line along at least one of said parking pass location and the parking position, where the pattern includes a non-uniform line or predetermined shape;
   each of said light source including means for independently adjusting a position of said light source relative to said housing by moving the said light source at a horizontal angle and a vertical angle to the housing so as to adjust said light projection onto a selectable location of said vehicle when said vehicle is in at least one of said predetermined parking pass location and the parking position;
   each of said light source including means of independently rotating each of said light source relative to said housing so that said light projection impinges on at least one of said parking pass location and the parking position of said vehicle at a selectable angle to said predetermined vehicle parking moving direction; and
   an electrical source powers said light sources, wherein
   the pattern is directed exclusively at a predetermined location within the vehicle when the vehicle is positioned properly in at least one of the predetermined parking pass location and the parking position.

2. The apparatus according to claim 1, where the light source is laser.

3. The apparatus according to claim 1, where said visible light patterns projection is produced by the characteristics of said lens which said light is projected through by said lens' intended design, manufacture processes, or other predetermined methods.

4. The apparatus according to claim 1, where said projection is a line shape.

5. The apparatus according to claim 1, where said visible patterns along said projection is a laser line with light strength and light width varying along the line.

6. The apparatus according to claim 5, where said laser line have a fan angle less than 15° and power less than 5 mW.

7. The apparatus according to claim 1, where a plurality of said light pattern projections are laser line beam projectors from one or more said apparatuses and are configurable to form T shape, V shape, X shape, dash line or other predetermined shape as a parking pattern projected onto a desired parking location on the dashboard of said vehicle when said vehicle is located under said desired parking pass location.

8. The apparatus according to claim 1, where first and second light patterns from first and second ones of the light sources are prohibited to overlap each other within a predetermined distance, and if said first and second light patterns overlap within a predetermined distance, then a strength of the first and second light patters is below a predetermined maximum strength.

9. The apparatus according to claim 8, where constraints are physically constructed on the apparatus that mechanically prevent the laser beams from overlapping each other within a predetermined distance.

10. A parking aid apparatus for guiding a vehicle into a desired parking position through a predetermined parking pass location, comprising:
    a housing for mounting to a structure;
    one or a plurality of light sources mounted in said housing and producing light pattern projections with visible pattern or short light line along at least one of said parking pass location and the parking position;
    each of said light projection source including means for independently adjusting the position of said light source relative to said housing within the housing so as to adjust of said light projection onto a selectable location of said vehicle when said vehicle is in at least one of the predetermined parking pass location and the parking position;
    each of said light projection source including means independently adjusting within the housing so that said light projection impinges on at least one of said parking pass location and the parking position of said vehicle at a selectable angle to the predetermined vehicle parking moving direction;
    an electrical source powers said light sources; and
    electrical sensors and switch circuits, installed inside said apparatus, constraining said laser projections from overlapping each other within a predetermined distance, wherein when said laser beams overlap each other within said predetermined distance said circuits will switch off said lasers.

11. The apparatus according to claim 1, where a plurality of said light projections of said apparatus of claim 1 is used to aid a plurality of vehicles parking at nearby parking spaces.

12. The apparatus according to claim 1, where said light pattern projections with a visible pattern or short light line along said parking pass location from said device of claim 1 can be used to park a plurality of different size vehicles at the same parking space without adjusting said light projections by remembering to stop each vehicle at different unique marks on said non-uniform projections when said predetermined mark reaches said targeted point on said vehicle.

13. The apparatus according to claim 10, wherein when said laser beams overlap each other within said predetermined distance, a warning light will turn on.

14. The apparatus according to claim 10, where said visible patterns along said projection is a laser line with light strength and light width varying along the line.

15. The apparatus according to claim 14, where said laser line has a fan angle less than 15° and power less than 5 mW.

16. A parking aid apparatus for guiding a vehicle into a desired parking position through a predetermined parking pass location, comprising:
    a housing for mounting to a structure;
    one or a plurality of light sources mounted in said housing and producing light pattern projections with each said light source passing through a single lens to form a visible pattern along at least one of said parking pass location and said parking position, where the pattern includes a non-uniform line or predetermined shape;
    each of said light source including means for independently adjusting a position of said light source relative to said housing by moving the said light source at a horizontal angle and a vertical angle to the housing so as to adjust said light projection onto a selectable location of said vehicle when said vehicle is in at least one of said predetermined parking pass location and the parking location;

each of said light source including means of independently rotating each of said light source relative to said housing so that said light projection impinges on at least one of said parking pass location and said parking position of said vehicle at a selectable angle to said predetermined vehicle parking moving direction; and
an electrical source powers said light sources, wherein
where said visible patterns along said projection has a light strength and a light width varying along the visible pattern.

17. The apparatus according to claim 16, where said laser line has a fan angle less than 15° and power less than 5 mW.

18. The apparatus according to claim 16, further comprising electrical sensors and switch circuits installed inside said apparatus constraining said laser projections from overlapping each other within a predetermined distance, wherein when said laser beams overlap each other within said predetermined distance said circuits will switch off said lasers.

* * * * *